United States Patent [19]

Sachs

[11] 4,400,708
[45] Aug. 23, 1983

[54] DISPOSABLE INKER CARTRIDGE AND HOLDER THEREFOR

[76] Inventor: Richard L. Sachs, 11072 Bel Aire Ct., Cupertino, Calif. 95014

[21] Appl. No.: 297,184

[22] Filed: Aug. 28, 1981

[51] Int. Cl.³ .......................................... G01D 15/16
[52] U.S. Cl. ................................................ 346/140 R
[58] Field of Search ....................... 346/75, 140, 33 F; 156/73.1, 380

[56] References Cited

U.S. PATENT DOCUMENTS

| | | | |
|---|---|---|---|
| 3,284,257 | 11/1966 | Soloff et al. | 156/73.1 |
| 3,340,541 | 9/1967 | Klassen et al. | 346/140 A |
| 3,572,400 | 3/1971 | Casner et al. | 346/33 F UX |
| 3,774,230 | 11/1973 | Tullos | 346/140 R |
| 4,160,256 | 7/1979 | Dziuk | 346/140 A |
| 4,263,072 | 4/1981 | Bull et al. | 156/73.1 |

Primary Examiner—Donald A. Griffin
Attorney, Agent, or Firm—Hamrick, Hoffman & Guillot

[57] ABSTRACT

A disposable inker cartridge (10), (210), (310) mountable in a holder (110) attachable to a marking head of a semiconductor wafer testing machine, and the like, provides a large reservoir of ink or other marking fluid a predetermined amount of which can be deposited on an article to be marked by actuation of a solenoid coil (128), (228) associated with the holder. The reservoir of ink can be sealed against leakage during shipment, storage, and handling, but can be easily installed on its associated holder when ready for use. Cartridges according to the invention permit much larger reservoirs of ink to be placed on a testing machine, thus reducing downtime for refilling conventional non-disposable arrangements and eliminating routine maintenance and necessary cleanup encountered with refillable devices.

11 Claims, 10 Drawing Figures

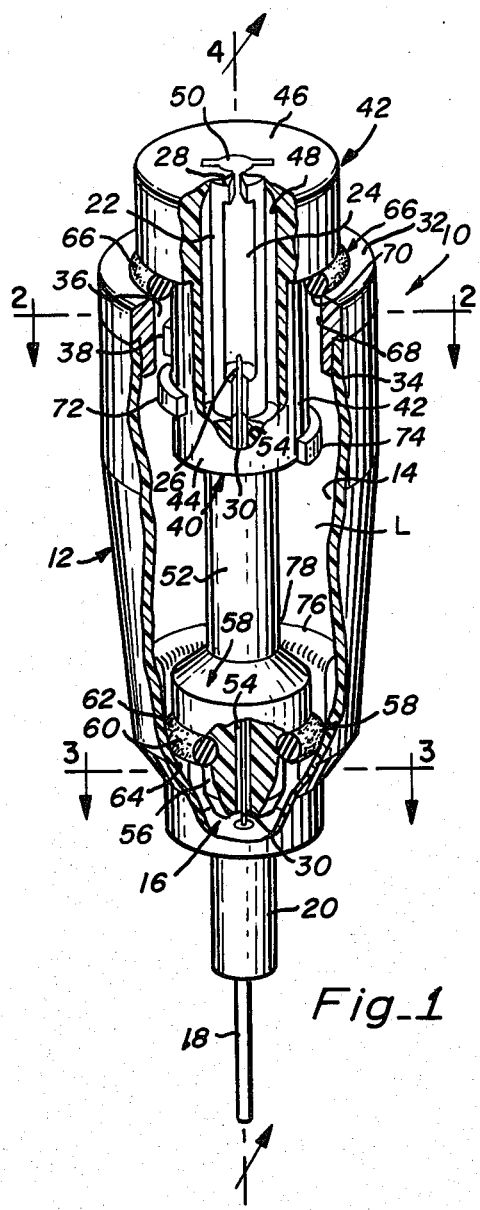
Fig_1
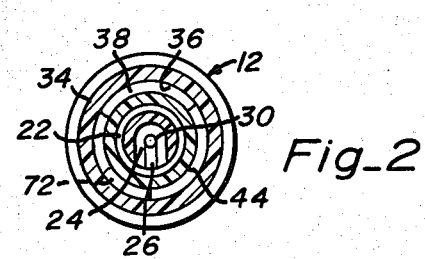
Fig_2
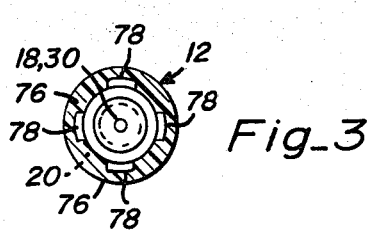
Fig_3
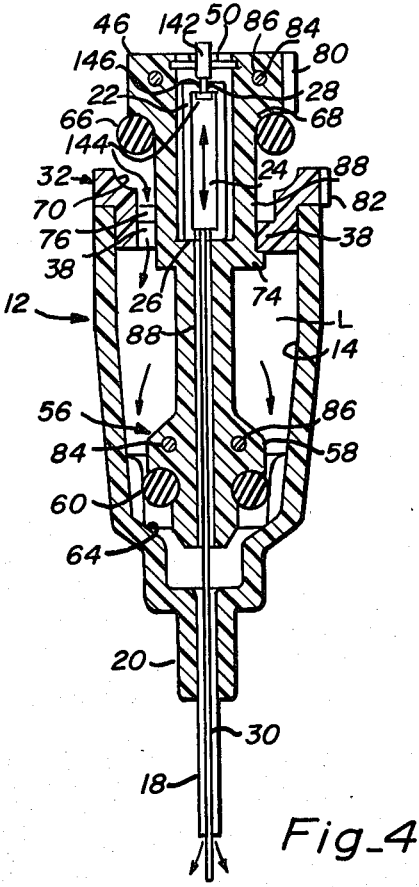
Fig_4
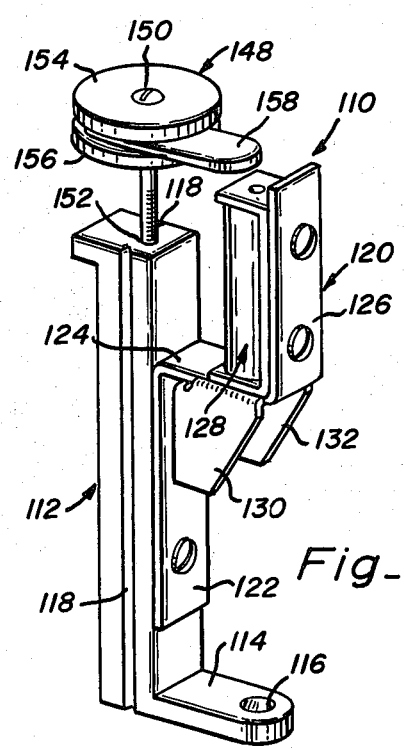
Fig_5

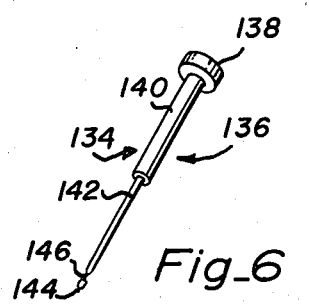
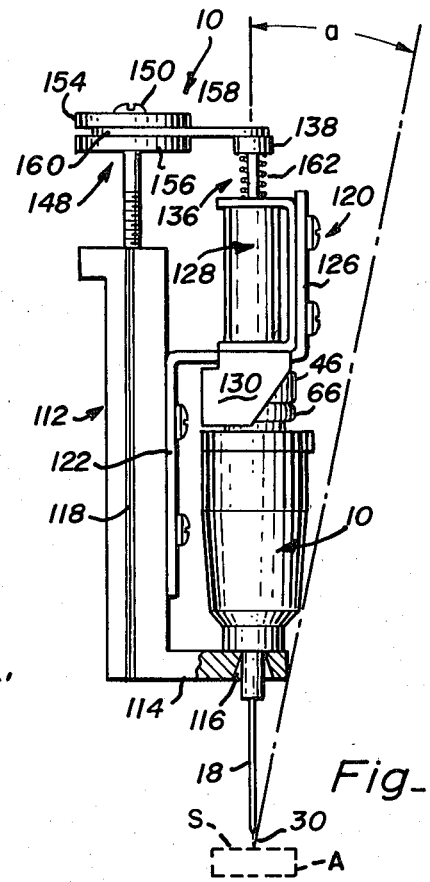
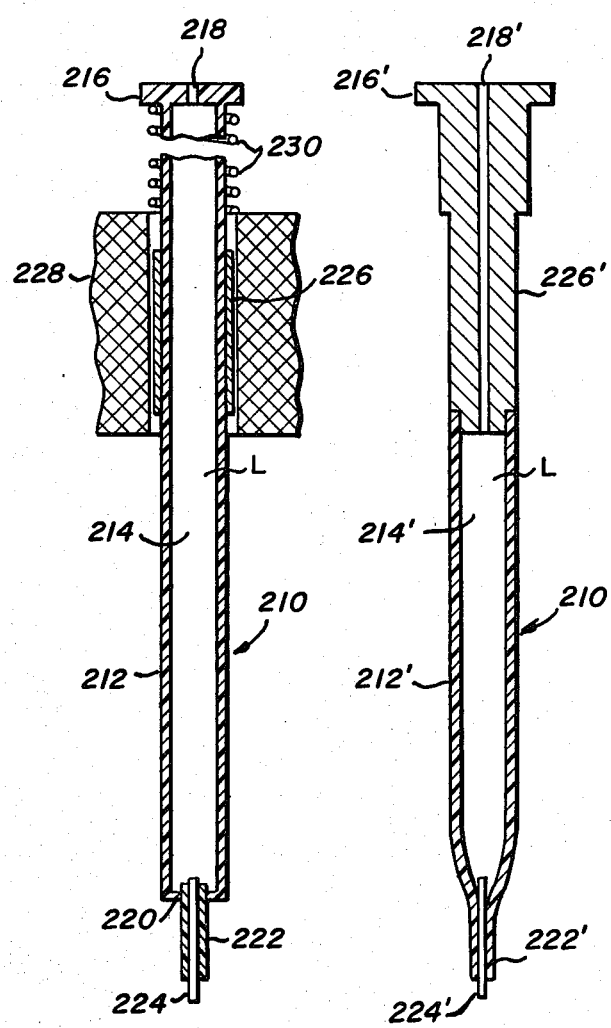
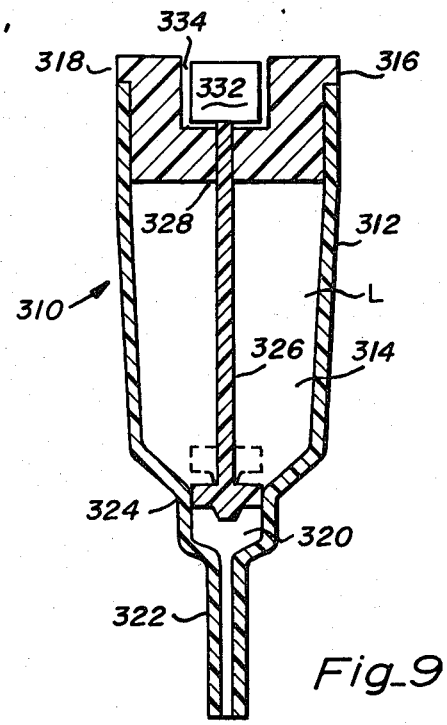
Fig_6
Fig_7
Fig_8A
Fig_8B
Fig_9

DISPOSABLE INKER CARTRIDGE AND HOLDER THEREFOR

BACKGROUND OF THE INVENTION

1. Field of the Invention

This invention relates generally to inkers of the kind used to deposit small quantities of ink upon selected portions of semiconductor wafers during electrical performance testing of such wafers, and more particularly to a disposable inker cartridge and associated holder for use with such inking devices.

2. Description of the Prior Art

Manufacture of semiconductor devices called integrated circuits is commonly carried out in a batch process involving a large disc-shaped slice of nearly pure, crystaline silicon generally referred to as a wafer. Each such wafer contains hundreds, and possibly even thousands, of completely independent circuits. At the completion of conventional chemical processing of a wafer, each independent circuit is tested and classified by high speed electrical and mechanical test equipment. In order to permit a visual recognition of the determined classification of each individual circuit on a wafer, it is conventional to deposit a small quantity of ink upon at least certain ones of the circuits at the completion of their testing. For example, a defective circuit may be marked with ink while the absence of an ink droplet usually signifies that the particular circuit meets required specifications. Various colors of ink can be employed to determine various levels of performance classifications for a specific circuit, with red ink being typically used to indicate a failing or non-functioning circuits.

Following such testing, each wafer is cut by methods known in the art into individual integrated circuits, sometimes referred to as a "die." In this process, the circuits are physically separated based on the presence and color of ink, if any, deposited on the die. Further processing is performed on the circuits based on the performance classifications and functionality determined at the wafer level testing stage.

The inker devices presently employed to deposit ink drops on semiconductor wafers involve a "soft contact" on the wafer of a piece of nylon filament, and the like, passed through a reservoir of ink. The filament is caused to momentarily contact a specific circuit of a wafer being tested so as to leave a small deposit of ink on the wafer. In a typical arrangement now being used, the filament is extended through an element similar in configuration to a hyperdermic needle and terminating in a needle portion into which the filament extends. The upper portion of this needle-like device forms a cup in which must be deposited a quantity of ink. The cup forms the reservoir of ink which is carried to the wafer by the filament. The latter is supported for reciprocating movement by a plunger-like member through which the element passes and which functions as the moveable core of a solenoid coil. Thus, selective actuation of the solenoid coil will move the plunger-like member, possibly against the bias of a return spring, in a downward direction so as to move the tip, or lower end, of the filament into contact with the surface of a wafer being tested.

The known apparatus as discussed above has several drawbacks, primary of which is the relatively small capacity of the permanently attached reservoir, which requires the unit to be stopped and frequently refilled with ink. Further, the filament often jams during operation, requiring the apparatus to be shut down for cleaning, refilling of ink, and necessary readjustment. In any event, the apparatus requires cleaning at the completion of each operating shift and a stock of springs, filaments, ink, and other items which need be replaced periodically. As a result, the presently employed equipment has been found relatively expensive and difficult to use, with much ink mess resulting from the necessary refilling and cleaning of the ink reservoir.

SUMMARY OF THE PRESENT INVENTION

It is an object of the present invention to provide an ink depositing system for marking semiconductor wafers, and the like, in a more economical and efficient manner than is now realized.

It is another object of the present invention to provide a self-contained disposable cartridge for a semiconductor wafer marking device, which cartridge contains a large reservoir of ink and all moving parts necessary to deposit a predetermined amount of the ink on a semiconductor wafer.

It is still another object of the present invention to provide a holder for a cartridge according to the present invention which will permit the cartridge to be inserted into and removed from a semiconductor wafer inker device in a simple and efficient manner.

Yet another object of the present invention is to provide a disposable inker cartridge which is safe to ship and handle, but is easily actuated for use when it is about to be inserted into an associated inker device for use.

These and other objects are achieved according to the present invention by providing a disposable cartridge capable of depositing ink, and the like, on a surface to be marked, and which comprises an applicator arrangement associated with a large reservoir of ink or other suitable marking fluid. The applicator arrangement includes a slideably-mounted filament, piston, or felt wick attached to an element which may be part of the cartridge or external of the cartridge and that functions as a moveable core of an annular solenoid coil arranged on a holder which also mounts the inker cartridge in an operative position relative to a semiconductor wafer, and the like, being tested. In a preferred embodiment of a cartridge using a moveable filament for depositing ink, a reservoir portion of the cartridge can be maintained fluid-tight so as to prevent spillage of ink during shipment and handling, but can be quickly changed to an open or unblocked mode by a user of the cartridge. Other embodiments of an inker cartridge according to the present invention are constructed in such a manner as to be safe during shipment, storage, and handling.

Accordingly, it is an advantage of the present invention that refilling of an ink reservoir of semiconductor marking devices, and the like, is eliminated.

It is another advantage of the present invention that a majority of the maintenance of a semiconductor wafer marking device is eliminated, it being only necessary to periodically replace an inker cartridge according to the present invention.

Still another advantage of the present invention is that the marking of semiconductor wafers during testing thereof can be carried out in a more efficient and economical manner than is currently possible.

IN THE DRAWINGS

FIG. 1 is a partially diagramatic, perspective view, partly broken away and in section, showing a first embodiment of an inker cartridge according to the present invention;

FIG. 2 is a sectional view taken generally along the line 2—2 of FIG. 1;

FIG. 3 is a sectional view taken generally along the line 3—3 of FIG. 1;

FIG. 4 is a partially diagramatic, sectional view taken generally along the line 4—4 of FIG. 1, but with the parts of the cartridge in a different position from that shown in FIG. 1;

FIG. 5 is a partly diagramatic, perspective view showing a holder capable of mounting the inker cartridge of FIGS. 1–4;

FIG. 6 is a perspective view showing a plunger useable as a moveable core with the solenoid coil of the holder shown in FIG. 5, which plunger is attachable to a disposable cartridge according to the present invention;

FIG. 7 is a partially schematic, side elevational view, partly broken away and in section, showing a disposable inker cartridge according to FIGS. 1–4 operably arranged in the holder shown in FIG. 5;

FIGS. 8a and 8b are diagramatic, vertical longitudinal sectional views showing a second embodiment of a disposable inker cartridge according to the present invention; and FIG. 9 is a diagramatic, vertical longitudinal sectional view showing still another embodiment of a disposable inker cartridge according the present invention.

DESCRIPTION OF THE PREFERRED EMBODIMENTS

The Embodiments of FIGS. 1–4

Referring now more particularly to FIGS. 1–4 of the drawings, a disposable inker cartridge 10 according to the present invention comprises a hollow body 12 of generally cylindrical configuration and creating an internal cavity 14 forming a reservoir for holding a supply of a liquid L, such as a conventional marking ink and the like. An applicator system 16 is associated with hollow body 12 for selectively withdrawing liquid L from cavity 14 as desired for marking purposes. This system 16 includes a hollow needle 18 similar to a hyperdermic needle and arranged to communicate with cavity 14 for providing a passage from the liquid reservoir to an article (not shown) to be inked. Needle 18 is embedded in the hollow passageway of an annular boss 20 extending downwardly from the lower end of body 12. The latter forms a sump for receiving the liquid L from cavity 14. System 16 also includes a connector 22 arranged for attachment to an actuator device such that movement of connector 22 by an actuator causes liquid L to move from cavity 14 and pass through needle 18. Connector 22 generally is in the form of a cylinder provided with a substantially U-shaped recess 24 extending between ends of the cylinder, in which ends are provided suitable slots 26 and 28. Slot 26 receives one end of a filament 30 and slot 28 facilitates attachment of connector 22 to suitable actuator device to be described below. Filament 30 is of a conventional nature, such as a length of nylon fishing line.

Although the liquid in cavity 14 has been generally designated, it is to be understood that the liquid can be an ink, dye, or any other substance commonly employed for marking semiconductor wafers, and the like. Filament 30 extends from connector 22 through the sump portion of cavity 14 and into needle 18 so as to extend slightly from needle 18 when in the marking position. The latter is the position shown in FIG. 4. Movement of connector 22 longitudinal to the extent of filament 30 will cause the latter to project from needle 18 when desired and deposit liquid L on an article (not shown) to be marked with liquid L.

Hollow body 12 is open at the upper end thereof, with an apertured cap 32 being arranged in the open upper end such that a sleeve portion 34 of cap 32 engages tightly against the upper inner wall portion of body 12. This sleeve portion forms an aperture 36 into which projects a ledge 38 that extends not quite 360° around sleeve portion 34 so as to provide an opening whose purpose will become clear below.

Rotatably mounted in aperture 36 of cap 32 is a stem 40 having a longitudinal extent comprising a head portion 42 disposed partially outside of hollow body 12 adjacent the upper end portion of same. Head portion 42 includes a shank 44 which is journalled in ledge 38 of sleeve portion 34 of cap 32 so as to permit rotation of stem 40 about its longitudinal extent. Terminating the upper portion of shank 44 is a generally disc-shaped flange 46 which cooperates with shank 44 to define a generally cylindrical chamber 48 extending longitudinally of the extent of filament 30 and connector 22. An opening 50 is defined centrally of flange 46 for a purpose to be described below.

A column portion 52 of stem 40 extends into hollow body 12 from head portion 42 and terminates adjacent needle 18 in the lower end of body 12. The portions 42 and 52 are affixed to one another for forming a unit rotatable as described above, and defining longitudinally therethrough from one end of body 12 to the other a straight bore 54 through which filament 30 is threaded. Terminating the lower end of column portion 52 is a foot 56 illustrated as being of increased diameter relative to the upper and middle sections of column portion 52.

Disposed at the interface of an upper enlarged portion 58 of foot 56 is a seal 60 in the form of an O-ring which rests in a seat 62 formed by the aforementioned interface of portion 58 and which abuts when seen in the closed (FIG. 1) mode against a seat 64 formed on the inner surface of the lower portion of hollow body 12. When arranged as shown in FIG. 1, seal 60 blocks fluid flow from cavity 14 of body 12 to needle 18 and filament 30. In a like manner, a seal 66, again in the form of an O-ring, is arranged at the junction between flange 46 and shank 44 of head portion 42 of stem 40 so as to engage in seat 68 of head portion 42 and in seat 70 of cap 32 for blocking, when seen in the FIG. 1 mode, fluid flow from cavity at head portion 42. It will be appreciated, therefore, that when the stem 40 is arranged with respect to hollow body 12 as seen in FIG. 1 of the drawings, liquid L is sealed within cavity 14 so as to prevent leakage and allow safe handling of cartridge 10 during shipping, storage, and the like.

Provided on shank 44 of stem 40 are a pair of cams 72 and 74 spaced longitudinally of the extent of shank 44 as well as angularly thereof for retaining stem 40 in either the blocking position, seen in FIG. 1, or an unblocked position, seen in FIG. 4, of seal 60 an 66. Thus, when in the mode seen in FIG. 1 the cam 72 will engage under ledge 38 as shown in FIG. 2 to restrain stem 40 against upward movement relative to body 12 and, therefore, retain seals 60 and 66 in the illustrated seated positions. When, however, stem 40 is rotated about its longitudinal extent, cam 72 is permitted to move into the interrupted portion of ledge 38 so that stem 40 can be moved upwardly relative to body 12 into the unblocked or operational position as illustrated in FIG. 4 of the drawings. Stem 40 will now be restrained from further upward movement relative to body 12 by the cam 74 which will now rest against the lower surface of ledge 38, and by a further rotation will be locked against downward movement relative to body 12 by cam 72 resting against the upper surface of ledge 38. Cartridge 10 is now ready for use. As can be seen from FIG. 4, air is permitted to flow downwardly through the interrupted portion of ledge 38 and into cavity 14 and exert atmospheric pressure on the upper surface of the reservoir of liquid L, while the plurality of guides 76 disposed around the lower portion of body 12 form gaps 78 between them which will permit the liquid L to pass by seal 60, kept out of gaps 78 by the guide 76, and into the sump portion of body 12 to wet filament 30. Capillary action will cause the liquid L to pass through needle 18 in the annular space formed by filament 30 and to collect in a predetermined amount at the lower end or tip of filament 30 for supplying the requisite amount of liquid to mark an article (not shown) to be marked by extension of the tip of filament 30 beyond the output end of needle 18. While dimensions can vary depending on the size of a cartridge according to the invention and its associated holder and equipment, an extension of approximately one eighth of an inch of the tip of filament 30 beyond the lower or output end of needle 18 has been found sufficient to permit filament 30 to touch the surface of a wafer (not shown) in a manner permitting it to deposit a small drop of ink or other suitable liquid on the wafer surfaces.

Actuating cartridge 10 preferrably is simplified by use of the illustrated ribs 80 and 82 provided on the outer peripheral portions of flange 46 and cap 32, respectively. Since rib 82 is stationary relative to body 12, one need only rotate flange 46 until rib 80 is in line with rib 82 to release cam 72 by aligning it with the interrupted portion of ledge 38, pull stem 40 upwardly relative to hollow body 12, and then continue rotating flange 46 until cam 72 rests in ledge 38.

Manner of Fabricating Embodiment of FIGS. 1-4

Still referring to FIG. 4, a preferred method for fabricating a cartridge 10 will now be described.

Hollow body 12, cap 32, and each longitudinal half of stem 40 is originally molded in a conventional manner. Stem 40 is provided with one of the illustrated pin 84 and pin receiving sockets 86. Needle 18 is press fit into the provided hole in boss 20. Cap 32 is then screwed to the top of hollow body 12. Once the complementary longitudinal halves of stem 40 have been molded, connector 22 is arranged in the semicylindrical chamber formed in the same half of stem 40. The filament 30 is inserted through needle 18 and threaded through O-ring 60 which is placed in the bottom of hollow body 17, arranged extending down the semicylindrical part of bore 54, and inserted into slot 26 of connector 22. Now the two complementary halves can be put together by use of the complementary locating pins 84 and sockets 86. Ridges 88 were molded on at least one of the halves of the stem 40, and once the two halves are joined together ultrasonic energy is applied as is conventional and well-known in the art in order to melt these ridges 88 into a secure fluid-tight bond joining together the two halves of stem 40. The seals 60 and 66 were put in place when the halves of stem 40 were placed together, the stem 40 being completed for body 12, cartridge 10 is now a fabricated unit. The ink or other liquid L can be injected into cavity 12 by pressing seal 60 against its seat 64 and injecting the liquid past the seal 66 and through the interruption in ledge 38 as by use of a suitable injection needle (not shown) and the like. Once the ink is injected into cavity 14, stem 40 can be rotated into a position as seen in FIG. 2 wherein cam 72 locks stem 40 against longitudinal movement relative to body 12.

The Holder of FIGS. 5-7

Referring now to FIG. 5 of the drawings, there is shown a holder 110 for mounting a cartridge 10 according to the invention on a conventional semiconductor testing machine, and the like. Holder 110 comprises an elongated element 112 having extending perpendicularly from one end thereof a projection 114. Opening 116 is defined in an outward portion of projection 114 so as to be arranged for receiving the boss 20 of a disposable inking cartridge 10. Longitudinal V-shaped grooves 118 are provided the extent of element 112 on side walls of element 112 so as to open perpendicularly to the extent of projection 114. These grooves 118 receive rails (not shown) of a mounting head conventionally provided on semiconductor wafer testing machines (not shown) of conventional construction. Accordingly, the provision of grooves 118 permits holder 110 to be mounted on conventional testing machines.

A generally Z-shaped bracket 120 is mounted on element 112 by leg portion 122 being secured as by the illustrated screw fasteners and arranged so that a web portion 124 extends cantilever fashion substantially parallel to projection 114. A leg piece 126 extends substantially perpendicularly to the extents of projection 114 and portion 124 so as to provide a mounting surface for the U-shaped support which retains an annualar winding of a conventional electrical solenoid coil 128 defining a through bore 129 arranged extending toward and oriented in-line with opening 116 of projection 114. Mounting of coil 128 on piece 126 can be effected by conventional screw fasteners as illustrated. Aprons 130 and 132 extend downwardly from web portion 124 toward projection 114 so as to form a partial enclosure for the top portion of a cartridge 10, as will become apparent below.

A core 134 (FIG. 6) is provided for coil 128 in the form of a plunger 136 having a disc-shaped head 138 from which extends a shank 140 having an extension 142 of reduced diameter and terminating in a tip 144 configured to form an annular groove 146 in cooperation with shank extension 142. An adjustable holddown arrangement 148 is provided on element 112 at the end thereof spaced from projection 114 for limiting a stroke of plunger 136 relative to the coil 128 of which plunger 136 can form a moving piston. Arrangement 148 includes a conventional screw 150 threaded into a threaded bore 152 provided in the upper surface of element 112. A pair of thumb wheels 154 and 156 are threaded onto screw 150 so as to clamp between them a generally rectangular plate 150 provided with a hole 160 (FIG. 7) adjacent one longitudinal end thereof so as to extend cantilever-fashion toward piece 126 of bracket 120.

Referring now more particularly to FIG. 7, a cartridge is shown as mounted on holder 110 so as to be engaged by plunger 136. The latter is shown as having the head 138 thereof contacted by the outermost end of plate 158 adjusted to the proper height by movement of screw 150 and rotation of the wheels 154, 156. A coiled compression spring 162 is advantageously arranged between head 138 of plunger 136 and the top surface of coil 128 for normally biasing head 138 against plate 158. By constructing plunger 136 from a ferrous or other magnetizable material, appropriate energization of coil 128, in a conventional manner not shown, will cause plunger 136 to move downwardly against the bias of spring 162 during such periods of energization. Shank extension 142 is attached to connector 22 of cartridge 10 in the manner illustrated in FIG. 1 by insertion of tip 144 of plunger 136 through hole 50 provided in flange 46 of stem 40 and snapping of groove 146 into the slot 28 provided in the uppermost end portion of connector 22. Thus, connector 22 of cartridge 10 will move together with plunger 136, simultaneously causing like movement of filament 30 so as to deposit a predetermined quantity of ink on an article A being marked. Once coil 128 is deenergized, spring 162 will return to the position seen in FIG. 7 wherein head 138 abuts plate 158.

By comparing FIGS. 1 and 7, it will be seen that the longitudinal extent of chamber 48 will also determine the limits of a stroke of filament 30. By proper design, however, chamber 30 should be dimensional so that the stroke of connector 22 will always be greater than that desired to be placed on plunger 136 by positioning of plate 158.

As also can be seen from FIG. 7, proper dimensioning of cartridge 10 and holder 110 should be such that an angle "a" included between a line extending through coil 128 and cartridge 10 to the terminal end of needle 18 and a line extending from the terminal end of needle 18 through a point contacting the tip of projection 114 and the outer surface of cartridge 10 will be in the range of, for example, 9 through 11 degrees.

The Embodiment of FIGS. 8a and 8b

FIG. 8a of the drawing illustrates a cartridge 210 according to the invention comprising a longitudinally extending tube 212 defining a cylindrical cavity 214 and an enlarged upper end 216 functioning in the manner of head 138 and enclosed except for a centrally disposed air hole 218. A lower enclosed end 220 has extending therefrom a needle 222 in which is disposed a wick 224 constructed from felt, nylon, or a similar material as commonly employed in felt-tip pens. Thus, it will be appreciated that tube 212 can be filed with a suitable liquid L such as ink to form a felt-tip cartridge pen. A sleeve 226 is affixed to the uppermost end of tube 212 forming a moving core for a conventional annular solenoid coil 228 similar to coil 128. By this arrangement, sleeve 226 will function to move tube 212 downwardly so as to bring wick 224 in contact with article (not shown) to be marked. Return of tube 212 to a normal non-marking position can be effected in a suitable manner, such as by the coiled compression spring 230 shown in FIG. 8. Thus, cartridge 210 does not require a separate moving core such as plunger 136 used with cartridge 10, hence even further simplifying construction. End 216 can limit upward movement of tube 212 by engagement with a hold-down device similar to arrangement 148. By proper dimensioning, cartridge 210 can be arranged in a holder similar to holder 110, but either without projection 114, or with projection 114 functioning as a downward movement stop.

FIG. 8b shows a cartridge 210' similar to cartridge 210, but having a piece of hollow tubing 212' into one end of which a needle 224' is inserted and tubing 212' crimped at 222' to hold needle 224' in place. An elongated solid member 226' is press fitted into an upper end of tubing 212' to function in the manner of sleeve 226, and is provided with an enlarged upper end 216' functioning as the end 216 of cartridge 210. An air hole 218' is provided through member 226' from end 216' to cavity 214' of tubing 212'.

The Embodiment of FIG. 9

FIG. 9 shows a cartridge 310 comprising a hollow body 312 defining a cavity 314 and having an open upper end 316 in which is sealingly disposed a cap 318. A lower portion of body 312 defines a sump 320 from which extends a needle 322. Disposed in sump 320 is a piston 324 which substantially sealingly engages with the walls defined in sump 320, but allows a slight leakage from cavity 314 into sump 320 of a liquid L forming a reservoir in cavity 314. Piston 324 is connected by a rod 326 slideably extending through a hole 328 provided in cap 318 to a connector 332 disposed in a chamber 334 formed in cap 318. Connector 332 may take any suitable form, but preferably is similar in construction to connector 22 of cartridge 10 so as to permit connector 332 to be connected to a plunger such as that designated 136. By this arrangement, cartridge 310 can be suitably configured in size so as to be used interchangeably with a cartridge 10.

As will be appreciated, a downward movement of connector 332 will cause a like downward movement of piston 324 and cause a predetermined quantity of liquid L to be dispensed from sump 320 through needle 322 and directly onto an article (not shwon) to be marked without the intermediary of a filament or wick.

As can be readily understood from the above description and from the drawings, disposable inker cartridges according to the present invention permit a safe, economical, and clean manner of refilling an inker device for a semiconductor wafer testing machine, and the like. Further, cartridges according to the invention permit a much larger amount of ink to be placed on an inker device than now provided for by conventional refillable inker devices. More importantly, cartridges according to the present invention can be used with holders compatible with existing inker devices, thus eliminating the need for substantial new investment.

Whereas, the preferred embodiment of the present invention has been described above, it is contemplated that other alterations and modifications may become apparent to those skilled in the art after having read the above disclosure. It is therefore intended that the appended claims be interpreted as covering all such alterations and modifications as fall within the true spirit and scope of the invention.

What is claimed is:

1. An inker device for mounting a disposable inker cartridge on a machine for testing each individual integrated circuit of a semiconductor wafer, the inker cartridge arrangeable for marking selected circuits of the wafer, the device comprising, in combination:
   (a) an elongated element having a projection extending perpendicular therefrom, the projection defining an opening arranged for receiving a needle of an inker cartridge;

(b) an annular electrical solenoid coil defining a through bore mounted on said element in spaced relation to said projection bore oriented on line with the opening; and (c) core means slideably insertable in the bore of said annular coil and engageable with a cartridge mounted on said bracket for being moved when said coil is energized and causing ink to be dispensed from said cartridge.

2. A device as defined in claim 1 wherein said core means includes a plunger slideable arranged in the bore of said coil and attachable to a cartridge mounted on said element, and an adjustable hold-down means mounted on said element in spaced relation to said projection for limiting a stroke of said plunger away from said coil.

3. A device as defined in claim 2, in combination with a disposable inker cartridge comprising, in combination:
(a) reservoir means for holding a supply of ink; and
(b) applicator means associated with said reservoir means for selectively withdrawing ink from said reservoir means and depositing the ink on an surface to be marked.

4. A disposable inker cartridge, comprising, in combination:
(a) reservoir means for holding a supply of a marking liquid;
(b) an actuator device including an annular electrical solenoid coil; and
(c) applicator means associated with said reservoir means for selectively drawing marking liquid from said reservoir means, said applicator means including a hollow needle, a porous wick disposed in said hollow needle and in communication with the marking liquid in said reservoir, and connector means for attachment to said actuator device, said connector means including a piece of magnetizable material affixed to the reservoir means and insertable in said annular electrical solenoid coil, movement of the connector means by said actuator device causing liquid to flow from said reservoir and pass through said needle.

5. A disposable inker cartridge, comprising, in combination:
(a) reservoir means for holding a supply of a marking liquid;
(b) an actuator device; and
(c) applicator means associated with said reservoir means for selectively drawing marking liquid from said reservoir means, said applicator means including a hollow needle communicating with said reservoir for providing a flow passage from said reservoir to a surface to be marked, and connector means for attachment to said actuator device, said applicator means further including a piston affixed to said connector means for movement therewith, said piston arranged within said reservoir means adjacent said hollow needle for selectively pumping marking fluid through said needle from said reservoir means.

6. A disposable inker cartridge, comprising, in combination:
(a) reservoir means for holding a supply of a marking liquid;
(b) an actuator device; and
(c) applicator means, associated with said reservoir means, for selectively drawing marking liquid from said reservoir means, said applicator means including a hollow needle communicating with said reservoir for providing a flow passage from said reservoir to a surface to be marked, said applicator means also including connector means for attachment to said actuator device, said applicator means further including a filament connected to said connector means and arranged extending through at least a portion of said reservoir means and into the passage of said needle, movement of said connector means causing said filament to project from said needle and deposit marking fluid on said surface.

7. A cartridge as defined in claim 6 wherein said reservoir means includes a hollow body forming a cavity for holding ink, said hollow body having a pair of spaced end portions, said needle being disposed at one of said end portions, and seal means arranged in said hollow body for blocking and unblocking said reservoir means.

8. A cartridge as defined in claim 7 wherein said seal means comprises a stem including, in combination:
(a) a head portion disposed partially outside of said hollow body at the other of said end portions of said hollow body;
(b) A column portion extending into the hollow body from the head portion and terminating adjacent said needle at the one of said ends, said head portion and column portion being affixed to one another for forming a unit;
(c) a first seal associated with said column portion for selectively blocking fluid flow from said reservoir by said head portion from the cavity formed by said hollow body; and
(d) a second seal associated with said column portion for selectively blocking fluid flow from the cavity of said hollow body to said needle.

9. A cartridge as defined in claim 8 wherein said hollow body is open at the other of said end portions, and said reservoir means further includes an apertured cap arranged in the open other of said end portions, said head portion being rotatably disposed in the apertured cap, and cam means being provided on the apertured cap and on said head portion for locking the stem in one of a position blocking fluid flow and aposition unblocking fluid flow.

10. A cartridge as disclosed in claim 9, in combination with an actuator means attached to said connector means of said applicator means for selectively moving the connector means and causing a predetermined quantity of marking fluid to be deposited outside of the cavity formed by said reservoir means.

11. A cartridge as defined in claim 9 wherein said actuator means comprises, in combination:
(a) holder means for mounting said cartridge adjacent an article being tested; and
(b) solenoid means including an annular coil defining a through bore and mounted on said holder means with the bore oriented in the direction of movement of the connector means, and a solenoid core slideably arranged in the bore of said coil and engaging said connector means of said cartridge for moving said connector means as a function of energization of said coil of said solenoid means.

* * * * *